United States Patent Office 3,021,242
Patented Feb. 13, 1962

3,021,242
BONDING ADDITIVES ONTO FILAMENT FILTERS
George P. Touey, Kingsport, Tenn., assignor to Eastman Kodak Company, Rochester, N.Y., a corporation of New Jersey
No Drawing. Filed Dec. 16, 1957, Ser. No. 702,804
8 Claims. (Cl. 156—180)

This invention relates to filament filters which carry an additive on the filaments. More particularly, this invention relates to filters made from continuous crimped cellulose acetate filaments wherein the additive on the filaments is more firmly bonded to the filaments than in comparable prior art type of filters.

This application is a continuation-in-part of my earlier application, Serial No. 476,549, filed December 20, 1954, now U.S. Patent No. 2,881,771. Tobacco smoke filters have been known for a number of years. The first type of filters were made from paper and fibrous masses. For example, a sheet or mat of filter material was subjected to cutting in order to obtain a square or rectangular unit which was used as a filter. However, such a unit did not conveniently give a round filter. In recent years the use of substantially parallel longitudinally oriented filaments as a filter medium has received favorable commercial acceptance. In order to increase the filtering efficiency of such filters it has been proposed to incorporate an additive onto the filaments. For example, it has been proposed to apply an electrostatic charge on the filaments and utilize such electrical charge for holding the additive onto the filaments by means of electrical attraction.

However, in a number of instances the prior art methods of trying to bond additives onto filaments have not been capable of bonding the materials very strongly. That is, the filters in the handling and particularly if they are strongly jarred, may cause the additive to become loosened and sift out. The loss of the additive from the filter by sifting out reduces the efficiency of the filter. Furthermore, in the instance of a tobacco smoke filter, if the additive sifts out and gets into the smoker's mouth, this may be objectional.

It is apparent, therefore, that the development of a method and product wherein an additive may be firmly bonded in a simple and economical manner represents a highly desirable result. After extended investigation I have found a method where this may be accomplished and whereby an improved filter product may be obtained.

This invention has for one object a method of more firmly bonding additives onto filament filters. Another object is to provide a method that is simple, economical and easy to adapt to existing set-ups presently used in the manufacture of filament filters. Still another object is to provide a method which utilizes chemical bonding for more firmly affixing the additive onto filament filters. Still another object is to provide a filter product which contains an additive, which additive is chemically and firmly bonded to the filaments. Other objects will appear hereinafter.

I have found that if the powdered additive which is to be incorporated on a filament filter has a chemical radical in its composition, which chemical radical is compatible with the plasticizer and preferably is the same or similar to the composition of the material making up the filament, that improved bonding may be secured. In further detail, assuming that the filament filter is comprised of cellulose acetate continuous filaments, then the filament composition would contain acetyl radicals. Accordingly, the additive in accordance with the present invention would be a material containing an acetyl radical in its composition. Hence, powdered cellulose acetate would be a particularly suitable additive because it not only contains an acetyl radical but is otherwise similar to the filament composition. By providing an acetyl radical in the additive there is secured an additive which is compatible with the plasticizer used on the filaments making up the filter. Accordingly, the plasticizer not only is taken up by the filaments but is also taken up by the additive. This permits the obtaining of not only bonding between the filaments but bonding of the additive to the filaments.

Inasmuch as plasticizer is applied to the filaments in the making of filters, the present invention does not necessitate substantial changes in existing operations because existing operations already have provisions for applying plasticizer. In most instances the requirement would merely be that larger amounts of plasticizer be applied to the filaments. Since in existing operations plasticizers are used which are compatible with the filaments being treated, in the present invention where the additive contains a certain radical it follows that the plasticizer would be compatible with the additive.

Expressed in another way, prior art additives have been dissimilar chemically and hence, in most instances either insoluble in the plasticizer or at least not particularly compatible therewith. Accordingly, in prior art procedures while the additive may be initially bonded to the filaments, the degree of bonding and the permanency of the bonding is not as great as in the present invention. Accordingly, as already described above, such dissimilar additives have tended to become loose from the filter and sift out or otherwise present problems.

In contrast thereto, in accordance with the present invention wherein an additive is used, which additive contains in its chemical make-up a compatible radical, it is possible to obtain immediate strong bonding, which bonding is considerably more permanent than the bonding obtained prior to the instant invention.

As regards to the types of cellulose acetate powder, it is preferred that the powders contain an acetyl content between the range of 28% and 44.7%. When the acetyl content of the powder is below this limit the powder is no longer solubilized or even partly solubilized by the plasticizer. The preferred acetyl content is between 36% and 44% since within this range the powder is most readily acted upon by the plasticizer spray. An illustrative formula for cellulose acetate is:

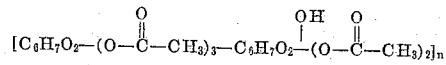

where $n = 100–600$.

The starch acetate powder should have an acetyl content within the range of 15% and 44.7%. The preferred acetyl content is 21 to 44.7%. An illustrative formula for starch acetate is

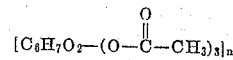

where $n = 100–300$.

As regards to the size of the cellulose acetate or starch acetate powders, it is desirable that the ultimate particles are within the range of 1 to 30 microns with an average diameter of 5 to 15 microns. This range of particle sizes has been most effective. Larger diameter particles, i.e., above 25 microns tend to impart an increased pressure drop to the filter. Also, the larger particles are not as readily acted upon by the plasticizer. The powders can be prepared from the acetylated cellulose or starch by any of the known procedures for obtaining finely divided powders. For example, the coarse starch acetate granules or the fibrous cellulose acetate particles can be ball milled and subsequently screened. They may be processed in a micropulverizer. Another method would be to spray dry a dope of the cellulose acetate or starch acetate using spray nozzles of the size required to produce powders in the specified particle size range.

As regards to the plasticizer used for fusing the particles to the fibers in the filter, any suitable non-toxic plasticizer may be used. Examples of such plasticizers are glycerol tri-, di-, and monoacetate, propylene glycol di- and monoacetate, di(methoxy ethyl)phthalate, and methyl phthalyl ethyl glycollate.

In the operation of the invention the tow should be spread out or debundlized during both the addition of the plasticizer and the powder dusting operation. Also it is preferred that, if the plasticizer is sprayed on the tow first, the tow is then dusted with the powder immediately after this operation. This is to prevent the plasticizer from being absorbed by the tow before it can make sufficient contact with the powder to fuse the powder to the tow. All of this is easily accomplished by the addition of a dusting booth or any other suitable dusting device to the cellulose acetate tow filter making machine. It is preferred to have the dusting apparatus situated on the assembly after the plasticizer spray booths. In this way the tow is immediately dusted after it has been exposed to the plasticizer spray.

The amount of cellulose acetate or starch acetate particles which should be added to the acetate tow filter material in order to make an improvement in its filtering effectiveness depends upon the number and size of the filaments in the filter and the amount of improvement desired by the filter manufacturer.

Excessive amounts of powder require excessive amounts of plasticizer to fuse the powder to the fibers. Such combinations lead to filters with high pressure drop. By study I have found that the powdered additive limits are generally between 10 and 40% based on the weight of the combination of acetate tow fibers, plasticizer, and powder. Below this additive concentration range the improvement in the effectiveness of the filter with the powdered additive over that of the control filter without the additive is slight. Above this range the pressure drop of the filter becomes larger than is usually desired. The preferred range of powdered additive is 15–30%.

The following examples are set forth for illustrating the preferred embodiments of the present invention.

EXAMPLE I

A continuous length of cellulose acetate yarn in tow form was fed into a cigarette filter rod making machine operating at the rate of 800 filter rods (90 mm.) per minute. The tow consisted of 8,750 filaments of 8 denier per filament and having an average crimp of 9 crimps per inch. The filter rod machine was equipped with a blooming device for spreading out the tow, a plasticizer spray booth, and a dusting booth in the order mentioned. After the tow was bloomed out to its maximum width, it was sprayed on both sides with glycerol triacetate by means of spray guns in the spray booth. After leaving the spray booth, the spread out tow passed through the dusting booth where it was dusted on both sides with a cellulose acetate powder with an average particle size of 7 microns. This acetyl content of the powder was 43.5%. Upon leaving the dusting booth the tow was carried by a series of rolls to a trumpet device and a paper wrapping and cutting device. The trumpet compacted the tow into the form of a rod 25.3 mm. in circumference whereupon it was wrapped in cigarette paper and cut into rods 90 mm. in length. The rods contained 22% cellulose acetate powder, 16% plasticizer, and 62% cellulose acetate yarn based on the combined weight of these three components.

After being stored for 30 minutes at 27° C. the rods were quite rigid. After a storage time of 24 hours, some of the rods were opened and examined under the microscope. This revealed that substantially all of the fibers had a rough, irregular surface due to the deposition of the cellulose acetate dust particles on the fibers. The examination also revealed that the particles were fused to the fibers due to the adhesive action of the plasticizer on both the surfaces of the yarn and the surfaces of the dust particles. The aged rods did not lose any of the powdered cellulose acetate when they were held in a vertical position and tapped against a metal plate.

Several of these filters, labelled Filters A, were cut into filter tips 15 mm. in length. These tips were attached to 10 cigarettes (Brand A) 85 mm. in length which had been shortened by 15 mm. to compensate for the length of the filter. These 10 filtered cigarettes were smoked to butt lengths of 35 mm. on a smoking machine similar in design and operation to the smoking machine described by J. A. Bradford and co-authors in Industrial and Engineering Chemistry 28, 836–839 (1936). The smoke which passed through the filter was collected and analyzed for nicotine and tar content. The results are shown in Table 1.

Control filter rods, labelled Filter B, and containing 18% plasticizer but no powdered additive were prepared in a similar manner from a cellulose acetate tow containing 10,000 filaments of 8 denier per filament. This was accomplished by eliminating the dusting apparatus on the rod making machine. The rods produced were 90 mm. in length and 25.3 mm. in circumference. These rods were also aged for one week at room temperature and then cut into 15 mm. filter tips and placed on the Brand A cigarettes shortened by 15 mm. These cigarettes were smoked to butt lengths of 35 mm. by means of the automatic smoking machine and the smoke which passed through the cigarettes was collected and analyzed for nicotine and tar content. The results are shown in Table 1.

Ten unfiltered Brand A cigarettes which were not shortened by 15 mm. were smoked to butt lengths of 35 mm. on the automatic smoking machine. The smoke which pased through these control cigarettes was collected and analyzed for nicotine and tar content. The results are shown in Table 1.

*Table 1*

NICOTINE AND TAR OBTAINED FROM FILTERED AND UNFILTERED BRAND A CIGARETTES

| Type of Filter on Cigarette | Av. Cigarette Pressure Drop [1] | Mg. Tar From 10 Cigarettes [2] | Mg. Nicotine From 10 Cigarettes | Percent Reduction In Tars Due to Filter | Percent Reduction In Nicotine Due to Filter |
|---|---|---|---|---|---|
| No Filter | 3.1 | 168 | 28 | | |
| B | 3.8 | 150 | 25 | 10.7 | 10.7 |
| A | 3.9 | 113 | 19 | 32.8 | 32.2 |

[1] Pressure drop expressed as inches of water at a flow rate of 17.5 ml./sec. through the cigarette.
[2] The portion of the smoke solids which is insoluble in water but soluble in chloroform.

The nicotine and tar reduction values shown in Table 1 show that the filter "A" containing the powdered cellulose acetate additive removed considerably more tar than the control filter "B." The cigarette pressure drop values show that this higher efficiency of filter "A" is not due to an increased pressure drop due to the powdered additive.

EXAMPLE II

A continuous length of cellulose acetate yarn tow containing 20,000 filaments of 5 denier per filament and having an average crimp of 9 crimps per inch was processed on the filter making machine. The machine was operated at the rate of 700 filter rods (90 mm.) per minute. While passing through the machine the tow was sprayed on both sides with glycerol triacetate plasticizer until 16% plasticizer had been added. No other additive was applied to the tow. The finished rods were cut into 15 mm. filters which were 25.3 mm. in circumference. The filters were placed on ten Brand A cigarettes shortened by 15 mm.

The cigarettes were smoked on the automatic smoking machine to butt lengths of 35 mm. and the smoke which passed through the cigarettes was collected and analyzed for nicotine and tar content. The milligrams of nicotine and tar which passed through the filter (Filter C) are listed in Table 2.

Another continuous length of the tow containing 14,000 filaments of 5 denier per filament and having an average crimp of 9 crimps per inch was processed on the machine. For this run the machine was operated at a rate of 700 filter rods per minute and contained a dusting booth immediately behind the plasticizer spray booth. While passing through the spray booth glycerol triacetate plasticizer was sprayed on both sides of the tow. While passing through the dusting booth, a finely divided powder of starch acetate 27% was added to the spread out tow. The average particle size of the powder was 6 microns. The finished 90 mm. rod was 25.3 mm. in circumference and contained 25% starch acetate and 18% plasticizer. After a storage time of 24 hours, some of the rods were opened and examined under the microscope which revealed that the fibers had starch acetate protrusions extending out from their surfaces. These starch acetate granules were fused to the fiber by the action of the plasticizer. The aged rods did not shown any tendency to lose the powder when they were tapped. Several of the rods were tested on the Brand A cigarettes in the manner described. The milligrams of nicotine and tar which passed through the filter (Filter D) are listed on Table 2.

Table 2

NICOTINE AND TAR OBTAINED FROM FILTERED BRAND A CIGARETTES

| Type of Filter on Cigarette | Av. Cigarette Pressure Drop | Mg. Tar From 10 Cigarettes | Mg. Nicotine From 10 Cigarettes | Percent Reduction In Tars Due To Filter [1] | Percent Reduction In Nicotine Due To Filter [1] |
|---|---|---|---|---|---|
| C | 4.1 | 130 | 22 | 22.6 | 21.5 |
| D | 4.0 | 110 | 18 | 34.5 | 35.6 |

[1] Percentage reductions based on the milligrams of nicotine and tar obtained from unfiltered Brand A cigarette (Example I).

It is believed further apparent from the above description that I provide a relatively simple, economical method. This is the situation because to carry out my method it is merely required that a dusting booth be placed adjacent the plasticizer spraying equipment. While I prefer to have the dusting booth immediately follow the plasticizer spraying equipment it is possible to have the dusting booth immediately preceding the plasticizer spray. Since the dusting booth can be very readily included in existing arrangements immediately in series with the plasticizer spraying equipment, it can be seen that the present invention very readily lends itself to incorporation into existing filter making operations.

I prefer powdered cellulose acetate as an additive because it is a good and readily available filter material. It is further useful not only because it contains the desired radical, namely an acetyl radical, but is fully similar to the cellulose acetate filaments making up the body of the filter. Therefore, no different chemical material is involved in making the filter.

The starch acetate referred to above while useful and compatible, because of the acetyl radical therein does differ to some extent in that a part of the additive molecule is different than the composition making up the filaments.

I claim:

1. A method of making a filament filter from continuous crimped cellulose acetate filaments which comprises spreading out several thousand of said filaments, spraying the spread-out filaments with a plasticizer for the cellulose acetate, and then dusting the filaments with a powdered additive that has an acetyl radical in its composition.

2. The process in accordance with claim 1 where the powdered additive is comprised of cellulose acetate.

3. The method in accordance with claim 1 wherein the powdered additive is starch acetate.

4. The process in accordance with claim 1 wherein the radical has an acetyl content of 28–44.7%.

5. The process in accordance with claim 1 wherein the particle size is 1–30 microns.

6. The method of manufacturing a cellulose acetate tobacco smoke filter which carries an acetyl containing additive on the surface of the filaments and wherein the additive is strongly bonded to the filaments, which comprises opening up a bundle made up of several thousand crimped continuous cellulose acetate filaments, spraying both sides of the opened up bundle with a plasticizer for the cellulose acetate filaments, applying to the sprayed filaments a powder of a particle size of 1–30 microns, said powder being of a composition having an acetyl content within the range of 15–44.7%, compacting the dusted filaments into the desired filter form and wrapping the periphery of the filter with a wrapper.

7. The method in accordance with claim 6 wherein the plasticizer is from the group consisting of glycerol tri-, di- and monoacetate, propylene glycol di- and monoacetate, di(methoxy ethyl)phthalate and methyl phthalyl ethyl glycollate.

8. The method in accordance with claim 6 wherein the additive is a starch acetate having an acetyl content of 21–44.7%.

References Cited in the file of this patent

UNITED STATES PATENTS

| | | |
|---|---|---|
| 1,578,960 | Davis | Mar. 30, 1926 |
| 2,281,100 | Land | Apr. 28, 1942 |
| 2,337,691 | Stettinius et al. | Dec. 28, 1943 |
| 2,489,466 | Schramm | Nov. 29, 1949 |
| 2,774,680 | Hackney et al. | Dec. 18, 1956 |
| 2,794,239 | Crawford et al. | June 4, 1957 |
| 2,794,480 | Crawford et al. | June 4, 1957 |
| 2,805,671 | Hackney et al. | Sept. 10, 1957 |
| 2,815,761 | Shearer | Dec. 10, 1957 |
| 2,881,771 | Touey | Apr. 14, 1959 |